United States Patent
Chen

(10) Patent No.: US 8,370,301 B1
(45) Date of Patent: *Feb. 5, 2013

(54) SYSTEM AND METHOD FOR REALLOCATING BLOCKS IN CHECKPOINTING BITMAP-BASED FILE SYSTEMS

(75) Inventor: Raymond C. Chen, Campbell, CA (US)

(73) Assignee: NetApp, Inc., Sunnyvale, CA (US)

( * ) Notice: Subject to any disclaimer, the term of this patent is extended or adjusted under 35 U.S.C. 154(b) by 1285 days.

This patent is subject to a terminal disclaimer.

(21) Appl. No.: 11/761,829

(22) Filed: Jun. 12, 2007

Related U.S. Application Data

(63) Continuation of application No. 10/394,689, filed on Mar. 21, 2003, now Pat. No. 7,231,409.

(51) Int. Cl.
*G06F 7/00* (2006.01)
*G06F 17/00* (2006.01)

(52) U.S. Cl. .................. 707/640; 707/661; 707/695

(58) Field of Classification Search .................. None
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,546,534 A | 8/1996 | Malcolm | |
| 5,727,206 A * | 3/1998 | Fish et al. ............... | 1/1 |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 6,038,570 A | 3/2000 | Hitz et al. | |
| 6,065,037 A | 5/2000 | Hitz et al. | |
| 6,182,198 B1 | 1/2001 | Hubis et al. | |
| 6,311,193 B1 | 10/2001 | Sekido | |
| 6,425,035 B2 | 7/2002 | Hoese et al. | |
| 6,434,681 B1 * | 8/2002 | Armangau ................. | 711/162 |
| 6,473,775 B1 * | 10/2002 | Kusters et al. ............. | 707/649 |
| 6,484,186 B1 | 11/2002 | Rungta | |
| 6,591,264 B1 | 7/2003 | Humlicek | |
| 6,636,941 B1 * | 10/2003 | Gold et al. ................. | 711/112 |
| 6,651,147 B2 * | 11/2003 | Burns et al. ............... | 711/154 |
| 6,725,392 B1 * | 4/2004 | Frey et al. ................. | 714/6 |
| 6,754,770 B2 * | 6/2004 | Kang et al. ................ | 711/114 |
| 6,779,095 B2 * | 8/2004 | Selkirk et al. ............. | 711/165 |
| 6,898,681 B2 * | 5/2005 | Young ........................ | 711/162 |
| 7,051,050 B2 | 5/2006 | Chen et al. | |

(Continued)

OTHER PUBLICATIONS

David Hitz et al. TR3002 File System Design for a NFS File Server Appliance published by Network Appliance, Inc.

(Continued)

*Primary Examiner* — Usmaan Saeed
(74) *Attorney, Agent, or Firm* — Cesari and McKenna, LLP

(57) ABSTRACT

A computerized file system has a first software layer for writing data blocks to persistent storage, and a second software layer for receiving requests from a client, and in response to receiving a request passing a command to the first software layer. A current bit map shows data blocks of persistent storage which are allocated to holding data of the file system. A safe copy of the current bit map is maintained. A third copy of the current bit map is passed, at a selected time, to the first software layer to enable the first software layer to write data blocks containing the bit map current at the selected time to the persistent storage, and simultaneously changing the current bit map as maintained in a computer memory while data blocks containing the bit map current at the selected time are written to the persistent storage.

18 Claims, 6 Drawing Sheets

U.S. PATENT DOCUMENTS

| | | | |
|---|---|---|---|
| 7,072,910 B2 | 7/2006 | Kahn et al. | |
| 7,082,506 B2 * | 7/2006 | Nakano et al. | 711/162 |
| 7,096,159 B2 | 8/2006 | Cataltepe et al. | |
| 7,454,445 B2 | 11/2008 | Lewis et al. | |
| 2002/0083037 A1 * | 6/2002 | Lewis et al. | 707/1 |
| 2003/0051111 A1 * | 3/2003 | Nakano et al. | 711/162 |
| 2003/0172316 A1 * | 9/2003 | Tremblay et al. | 714/7 |
| 2003/0225967 A1 * | 12/2003 | Kohli | 711/112 |
| 2004/0030846 A1 * | 2/2004 | Armangau et al. | 711/154 |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

\* cited by examiner

SYSTEM AND METHOD FOR REALLOCATING BLOCKS IN CHECKPOINTING BITMAP-BASED FILE SYSTEMS

RELATED APPLICATIONS

This patent application is a continuation of U.S. patent application Ser. No. 10/394,689 filed Mar. 21, 2003, now issued as U.S. Pat. No. 7,231,409, and titled SYSTEM AND METHOD FOR REALLOCATING BLOCKS IN CHECKPOINTING BITMAP-BASED FILE SYSTEMS.

FIELD OF THE INVENTION

The present invention relates to the file systems and, more specifically to tracking allocated blocks in a file system.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as modes and data blocks, on disk are typically fixed. An mode is a data structure used to store information, such as metadata, about a file, whereas the data blocks are structures used to store the actual data for the file. The information contained in an mode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the modes and data blocks are is made "in-place" in accordance with the write in-place file system. If an update to a file extends the quantity of data for the file, an additional data block is allocated and the appropriate mode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system manages data access and may, in case of a filer, implement file system semantics, such as the Data ONTAP™ storage operating system, implemented as a microkernel, and available from Network Appliance, Inc., of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate caching of parity information with respect to the striped data. In the example of a WAFL-based file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

File systems require a methodology to track the allocation status of the disk blocks within a file system. By "allocation status" it is meant whether a block has been allocated by a file or directory or whether the block is free to be allocated. File systems typically utilize a bitmap file wherein each bit is associated with a block in the file system. If the bit is set (i.e. equal to 1) then the block has been allocated in the file system and is thereby associated with. Similarly, if the bit is not set (i.e. equal to 0) then the block has not been allocated in the file system and is free to be allocated.

However, in checkpointing systems, like the above-described WAFL file system, a free block cannot be allocated until the block's allocation status has free) has been reflected in a checkpoint. Note that, in a checkpointing file system, a checkpoint of the file system is created, typically at regular time intervals. This "checkpoint" is a consistent and up-to-date version of the file system that is typically written to disk. Thus, in the event of a crash, only data written after the last checkpoint would be lost or corrupted. If a journalling file system is utilized, the stored operations can be replayed to bring the file system completely up to date after a crash or other error condition. Thus, in a checkpointing system, the file system must track all of the blocks freed after the most recent checkpoint and not allocate any of those freed blocks until after the checkpoint is safely written to disk.

The newly freed blocks (post checkpoint) cannot be reused (i.e., allocated again) until after the data has been written to disk to avoid the possibility that a block could be freed and then reused before the status of the block has been written to disk. If, for example, a new checkpoint is interrupted while writing its changes (data) to disk by a server crash or other failure, the previous checkpoint could now contain data generated as part of the new checkpoint if a block that was in use in the previous checkpoint was freed after the previous checkpoint and allocated (reused) by the new checkpoint to store new data. Therefore, overwriting blocks that are known to be allocated at the time of the previous checkpoint compromises the integrity of that checkpoint and therefore the consistency and integrity of the file system itself in such situations.

In a known file server implementation, two copies of the bitmap are utilized. A "current copy" is utilized to track what has been allocated, while a "safe copy" tracks what can actually be used. Utilizing this two-copy methodology, a block can be allocated if it is marked free in the safe copy. After the checkpointing process, the current copy is moved to the safe copy and the old safe copy is freed, or otherwise disposed of. A noted disadvantage of this methodology is that the file system is not able to allocate a block while the bitmaps are being written to disk for example during a checkpoint operation. Allocation of blocks is, again, desirable at this time because various file system processes, such as restoring files from a snapshot or utilizing file folding techniques, described further below, can continue to operate during the time while the bitmaps are being written to disk. This added operating time permits these various file system processes to complete more quickly. During the writing process, the safe copy is locked or otherwise owned by a disk storage layer—for example a Redundant Array of Inexpensive (or "Independent") Disks (RAID) layer of a storage operating system.

Certain file systems include the capability to generate snapshots, described further below, of an active file system. In such file systems, a block may be incorporated into a snapshot and then deleted from the active file system. The block will then be marked as unallocated in the bitmap; however, if the snapshot and active file system share the same logical address space, the block is still physically resident on the storage device. A problem arises when a user desires to reallocate the block from the snapshot to the active file system as the bitmap describing those blocks in the active file system has the given block marked as unallocated.

SUMMARY OF THE INVENTION

The disadvantages of the prior art are overcome by providing a system and method for reallocating blocks in a checkpointing bitmap-based file system. The system and method allow blocks that have been deleted from the active file system but are still referenced by file system snapshots to be integrated back into the active file system. This procedure is called block reallocation. This system and method allows various file system processes to continue to free and/or allocate blocks while a checkpointing operation is ongoing. A set of bitmap management processes, located within a file system layer of a storage operating system, provides a set of procedures for managing a set of bitmaps that track the allocation status of blocks within a given file system. When attempting to reallocate a block, the bitmap management processes verify that a snapshot references the block in question before proceeding to allocate the block. The bitmap management processes also create a third copy for use when the RAID, or file storage layer of a storage operating system is currently writing the bitmap to disk during a checkpointing operation. This third copy of the bitmap can then be utilized by various file system processes to track and alter the allocation status of blocks within a file system. These file system processes can include restoring a file from a snapshot or other archival backup methodology, or utilizing a file folding methodology to reduce disk usage.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
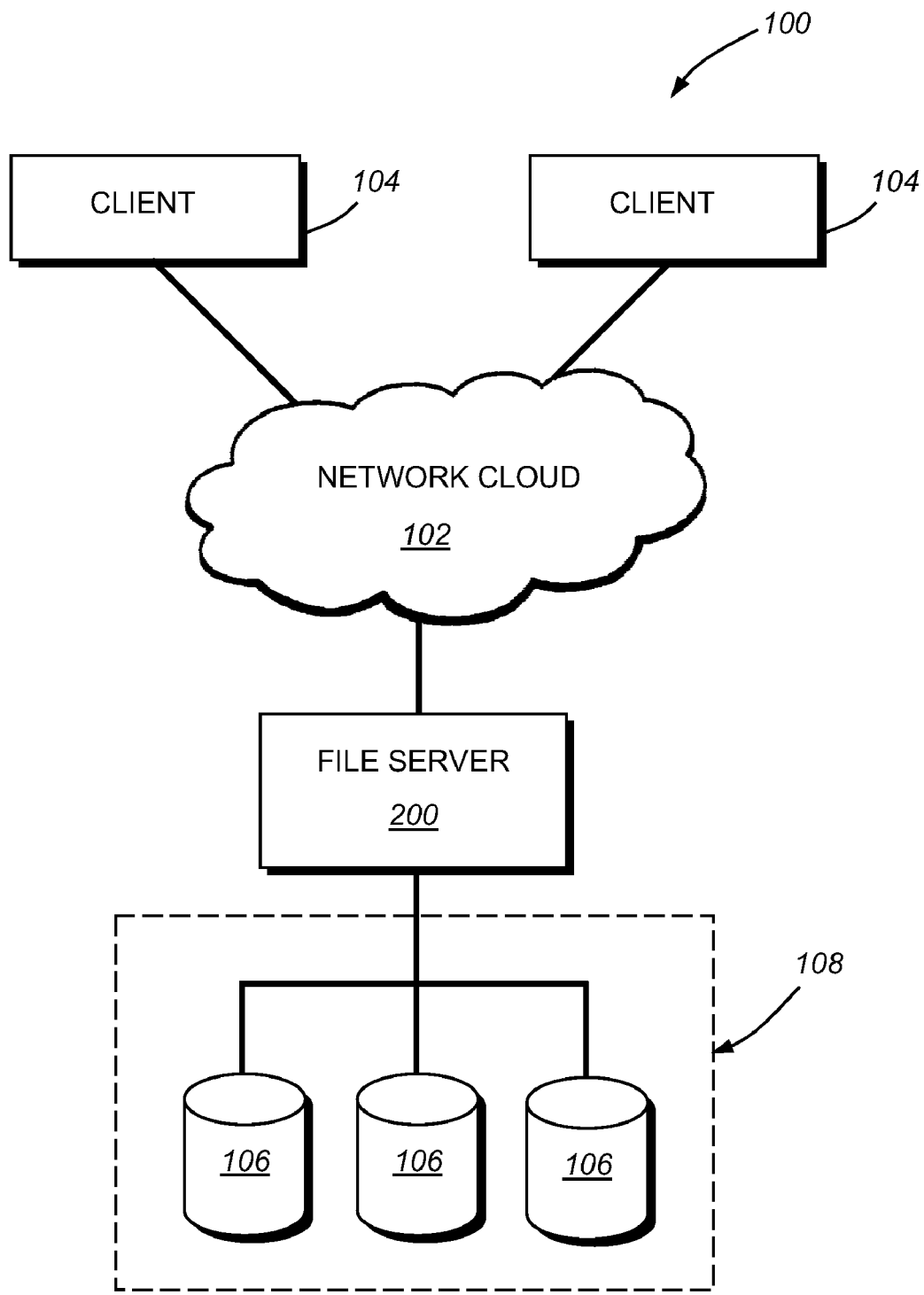
FIG. 1 is a schematic block diagram of an exemplary environment having clients and file servers.

FIG. 1 is a schematic block diagram of an exemplary network environment 100 in which the principles of the present invention are implemented. The environment 100 is based around a network cloud 102. This network cloud can be a local or network (LAN), a wide area network (WAN), virtual private network (VPN) utilizing communication links over the internet, for example, or a combination of LAN, WAN and VPN implementations can be established. For the purposes of this description, the term network cloud should be taken broadly to include any acceptable network architecture. The network cloud 102 interconnects various clients 104. Also attached to the network cloud is a is file server 200. This file server, described further below, is configured to control storage of, and access to, data and a set 108 of interconnected storage devices 106. Each of the devices attached to the network cloud include an appropriate conventional network interface arrangement (not shown) for communicating over the network cloud using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

B. File Servers

Figure 2:
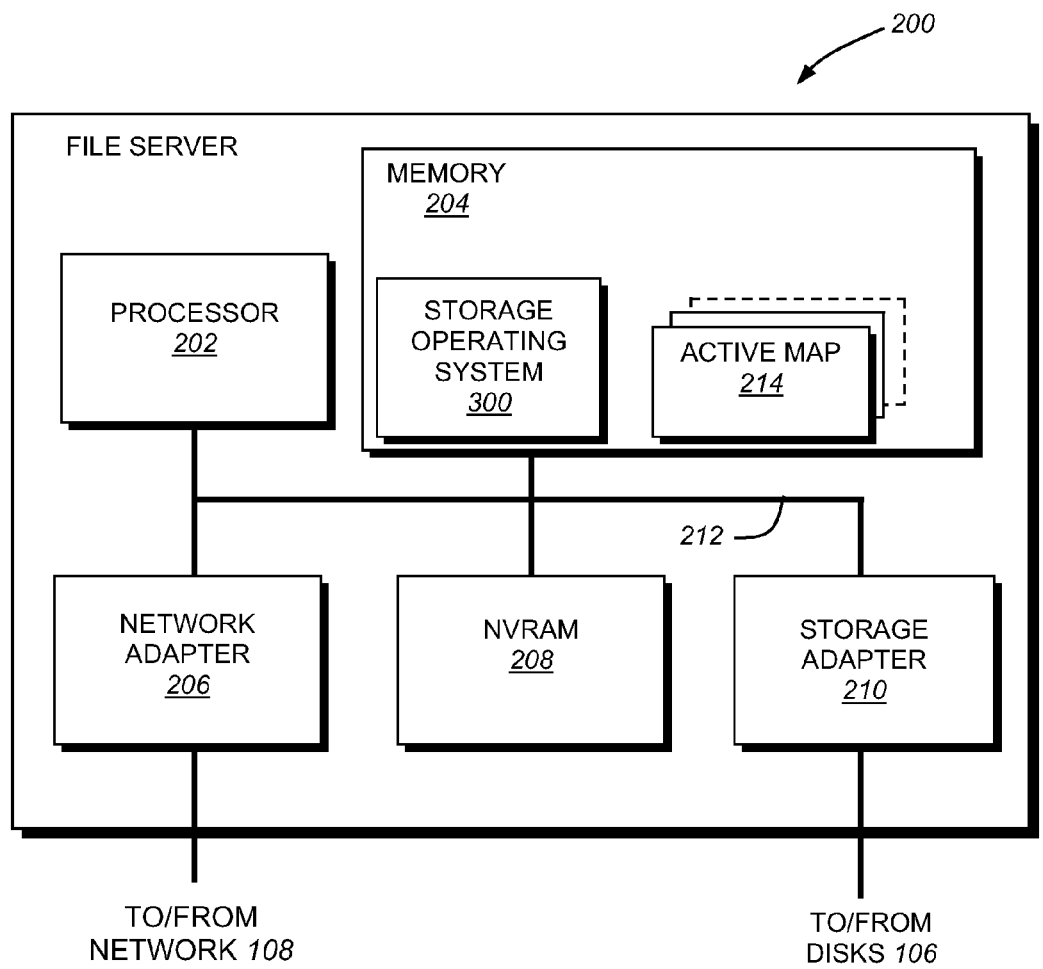
FIG. 2 is a schematic block diagram of an exemplary file server for use in accordance with an embodiment of the invention.
Figure 3:
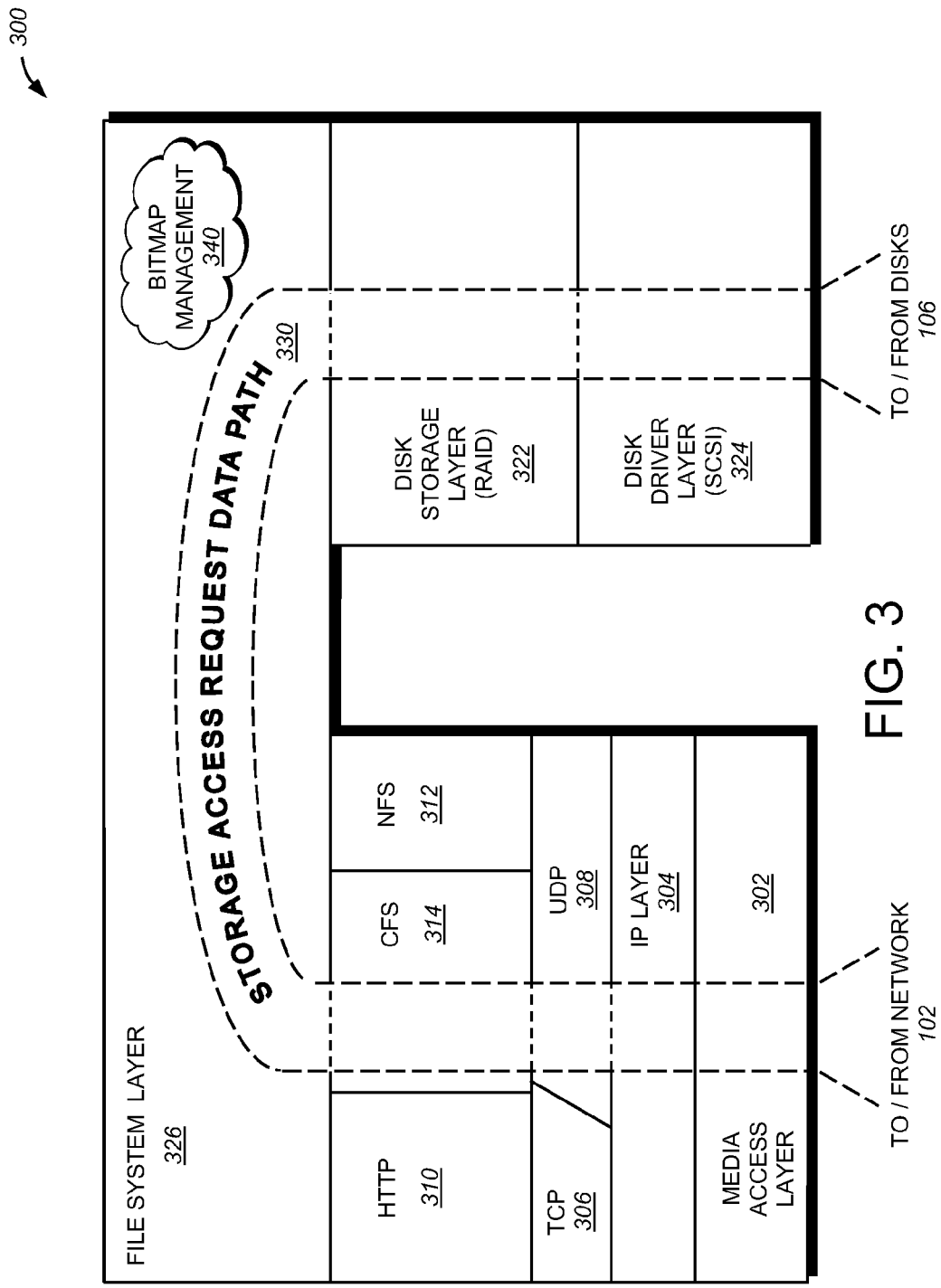
FIG. 3 is a schematic block diagram of an exemplary storage operating system for use with a file server in accordance with an embodiment of the present invention.

FIG. 2 is a more-detailed schematic block diagram of an exemplary file server 200. By way of background, a file server or filer, is a computer that provides file service relating to the organization of information on storage devices, such as disks. However, it will be understood by those skilled in the art that the inventive concepts described here any may apply to any type of file server, wherever implemented as a specialpurpose or general-purpose computer, including a standalone computer.

The file server 200 comprises a processor 202, a memory 204, a network adapter 206, a nonvolatile random access memory (NVRAM) 208 and a storage adapter 210 interconnected by system bus 212. Contained within the memory 204 is a storage operating system 300 that implements a file system to logically organize the information as a hierarchical structure of directories and files on the disks. In the illustrative embodiment, the memory 204 comprises storage locations that are addressable by the processor and adapters for storing software program code. The operating system 300, portions of which are typically resident in memory and executed by the processing elements, functionally organizes the filer by inter alia, invoking storage operations in support of a file service implemented by the file server.

The network adapter 206 comprises a mechanical, electrical and signaling circuitry needed to connect the file server 200 to client 104 over network cloud 102. The client 104 maybe a general-purpose computer configured to execute applications, such as data base applications. Moreover, the client 104 may interact with the filer server 200 in accordance with the client/server model of information delivery. That is, the client may request the services of the file server, and the file server may return the results of the services requested by the client, by exchanging packets defined by an appropriate networking protocol.

The storage adapter 210 incorporates with the storage operating system 300 executing on the file server to access information requested by the client. Information maybe stored on the disks 106 of a disk 108 (FIG. 1) that are attached via the storage adapter 210 to the file server. The storage adapter 510 includes input/output (I/O) interface circuitry that couples to the disks over in I/O interconnect arrangement, such as a conventional high-performance Fibre Channel serial link topology. The information is retrieved by the storage adapter and, if necessary, processed by the processor 202 (or the adapter 210 itself) prior to be forwarded over the system bus 212 to the network adapter 206, where information is formatted into appropriate packets and returned to the client 104.

In one exemplary file server implementation, the file server can include a non-volatile random access memory (NVRAM) 208 that provides fault-tolerant backup of data, enabling the integrity of filer server transactions to survive a service interruption based upon a power failure, or other fault.

Notably, the memory 204 includes an active map 214. The active map 214 is a bitmap data structure that is used by the file system to track which blocks are allocated by the active file system. This data structure is utilized by the storage operating system 300 to track which blocks are allocated and which are free within the file system. In accordance with certain embodiments of the invention, multiple copies of the active map may be present in memory at any given time. The use of multiple copies of the active map 214 is described below. As used herein, the term "bitmap" should be taken to mean the active map or any other suitable data structure for tracking the allocation status of disks in a file system, including, for example, an extent map that stores block ranges of free/allocated blocks instead of storing one bit per block. In alternate embodiments, the memory may include one or more snapshot maps (not shown). The snapmaps track which blocks have been allocated, or referenced by, the snapshot, similar to how the active map tracks those blocks allocated in the active file system.

By way of further background, "snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights. A snapshot is a restorable version of a file system created at a predetermined point in time. The snapshot is stored on-disk along with the active file system, thereby allowing any given block to be part of the active file system and/or any number of snapshots.

C. Storage Operating System

To facilitate the generalized access to the disks 106 on the array 108, the storage operating system 300 implements write-anywhere file system that logically organizes the information as a hierarchical structure of directories and files on the disks. Each "ondisk" file may be implemented as a set of disks blocks configured to store information, such as data, where as the directory may be implemented as a specially formatted file which other files and directories are stored. As noted above, in the illustrative embodiment described herein, the operating system is the NetApp® Data ONTAP™ operating system available from Network Appliance, Inc., that implements the write-anywhere file layout (WAFL™) file system. It is expressly contemplated that any appropriate file system can be used, and as such, where the term WAFL or file system is employed, it should be taken broadly to refer to any file system that is otherwise adaptable to the teachings of this invention.

The storage operating system comprises a series of software layers, including a media access layer 302 of network drivers (e.g., an Ethernet driver). The storage operating system 300 further includes network protocol layers, such as an Internet Protocol (IP) layer 304 and its supporting transport mechanisms, the Transport Control Protocol (TCP) layer 306 and the User Datagram Protocol (UDP) layer 308.

A file system protocol layer provides multi-protocol data access and, to that end, includes support for the Network File System (NFS) protocol 312, the Common Internet File System (CIFS) protocol 314 and the Hyper Text Transfer Protocol (HTTP) 316. In addition, the storage operating system 300 includes a disk storage layer 322 that implements a disk storage protocol, such as a RAID protocol, and a disk driver layer 324 that implements a disk access protocol such as, e.g., a Small Computer System Interface (SCSI) protocol.

Bridging the disk software layers with the network and file system protocol layers is a file system layer 326 of the storage operating system 300. Generally the file system layer 326 implements a file system having an on-disk format representation that is blockbased using, e.g., 4-kilobyte (KB) data blocks and using modes to describe the files. Note that while files are implemented in an illustrative embodiment, the term "file" should be taken broadly to include any type of data organization or "data container", including those used by block-level protocols, such as SCSI. The term "data container" will therefore be used interchangeably for files herein. As used herein, a file system is a programmatic entity that imposes structure on the address space of one or more physical or virtual disks so that the storage operating system may conveniently deal with data containers, including files. An "active file system" is a file system to which data can be both written and read, or, more generally, an active store that responds to both read and write I/O operations. Similarly, a snapshot is a reference store or image of the file system at a point in time that is typically read-only.

Before proceeding with a more detailed description of the illustrative embodiment, the following definitions are provided. The term "data container", as noted above, shall refer generally to a file, LUN (logical unit number), or any other separately or individually addressable data structure or logical group of data blocks residing on persistent storage. The term "volume" in this context shall refer to a logical group of data containers. The term "directory" shall refer to an organizational structure that facilitates access to a given data container through traversal of trees or other logical indexing structures. Likewise, the term "pathway" or "path" shall refer to the route taken by the storage operating system through the directory structure in addressing the data container. The term "metadata" refers to data that is generated, stores and managed by the storage operating system, and its associated file system layer, to maintain the structure and organization of the file system. Metadata can include, for example, security attributes associated with files or data containers. As the storage operating system and its associated file system generate metadata, it is referred to herein as "internally generated data." Conversely, all other data stored by the file system, including, for example, data generated by network clients and/or other processes in the storage operating system is referred to as "externally generated data." In addition, it is expressly contemplated that the teachings of the present invention can be applied to a variety of storage environments and data types including, but not limited to, file data, database data and/or block-level data.

In response to transaction requests, the file system generates operations to load (retrieve) the requested data from disks 106 if it is not resident "in-core", i.e., in the filer's memory 204. If the information is not in memory, the file system layer 326 indexes into the mode file using the mode number to access an appropriate entry and retrieve a logical volume block number. The file system layer 326 then passes the logical volume block number to the disk storage (RAID) layer, which maps that logical number to a disk block number and sends the latter to an appropriate driver (for example, an encapsulation of SCSI implemented on a Fibre Channel disk interconnection) of the disk driver layer. The disk driver accesses the disk block number from disks 106 and loads the requested data in memory 204 for processing by the filer 200. Upon completion of the request, the filer (and storage operating system) returns a reply, e.g., a conventional acknowledgement packet defined by the Common Internet File System (CIFS) specification, to the client 104 over the network 102.

It should be noted that the storage access request data path 330 through storage operating system layers described above needed to perform data storage access for the client requests received the file server may alternately be implemented in hardware, software or a combination of hardware and software. That is, in an alternative embodiment of this invention, the storage access request data path 330 may be implemented as logic circuitry embodied within a field programmable gate array (FPGA) or in an application specific integrated circuit (ASIC). This type of hardware implementation increases the performance of the file service provided by the file server 200 in response to a file system request issued by a client.

Included within the file system layer 326 is a set of bitmap management processes 340, which provide functionality to implement and manage the active map 214, which enables the file system layer to track which blocks are freed or allocated in a given file system. The bitmap management functions 340 also implement the block reallocation system and method described further below.

D. Block Reallocation

The novel bitmap management processes 340 provide a set of procedures that enable the file system layer 326 to track which blocks are free or allocated in a given file system. The bitmap management processes allow blocks that have been deleted from the active file system but are still referenced by the file system snapshots to be integrated back into the active file system. Thus, for example, a file that was incorporated into a snapshot and then later deleted from the active file system may be retrieved from the snapshot and "moved" to the active file system. As the snapshot and the active file system share the same logical addressing space, no data will need to be copied to effectuate such a move. An example of such a file restoration process and a method for restoring file system structure from a snapshot is described in U.S. patent application Ser. No. 10/100,948 entitled SYSTEM AND METHOD FOR RESTORING A SINGLE FILE FROM A SNAPSHOT by Raymond C. Chen, et al, the contents of which are hereby incorporated by reference, Additionally, the bitmap management processes 340, by generating a third, or RAID copy, of the bitmap, permit blocks to be freed and/or allocated while the bitmap is actually being written to disk during a checkpoint operation. These capabilities allow certain file system processes (not shown) to make progress during the time when the bitmap is being written to disk. Examples of such a process include restoring a file from a snapshot as described in the above-incorporated patent application or utilizing a file folding technique such as that described in U.S. patent application Ser. No. 10/104,694 entitled FILE FOLDING TECHNIQUE by Andy C. Kahn et al., which is hereby incorporated by reference.

The bitmap management processes 340 extend the concept of having a safe and current copy of the bitmaps by adding a third, or RAID copy, when needed. By not maintaining three separate copies of the bitmap, substantial memory space is saved. This third copy of the bitmap can be passed or utilized by the RAID layer of the storage operating system when writing the bitmaps to disk during a checkpointing operation. It should be noted that this illustrative embodiment is written with reference to a RAID copy and a RAID layer of a storage operating system for exemplary purposes only. As used herein, the term "RAID copy" should be taken to mean any copy suitable for use by a storage system that is the authoritative copy of the data (i.e. the bitmap) to be written to disk.

This generation of a RAID copy, when needed, permits the bitmap processes to continue to modify the safe and/or current copies of the bitmap during the checkpointing operation, which can greatly improve system performance during certain file system operations, as described above. The RAID copy permits these file system processes to continue to allocate or reallocate blocks while the bitmap is being written to disk. This third copy of the bitmaps is passed to the RAID layer of the storage operating system for use in writing the bitmaps to disk. As the RAID layer will have its own copy of the bitmaps, the safe and current copies can continue to be utilized by various file system processes for block allocation, reallocation and freeing.

The bitmap processes 340 provide three separate procedures, including one for freeing a block, allocating a block and reallocating a block, which permit blocks to be allocated while the RAID layer is committing a copy of the bitmaps to disk during a checkpoint.

Freeing A Block

Figure 4:
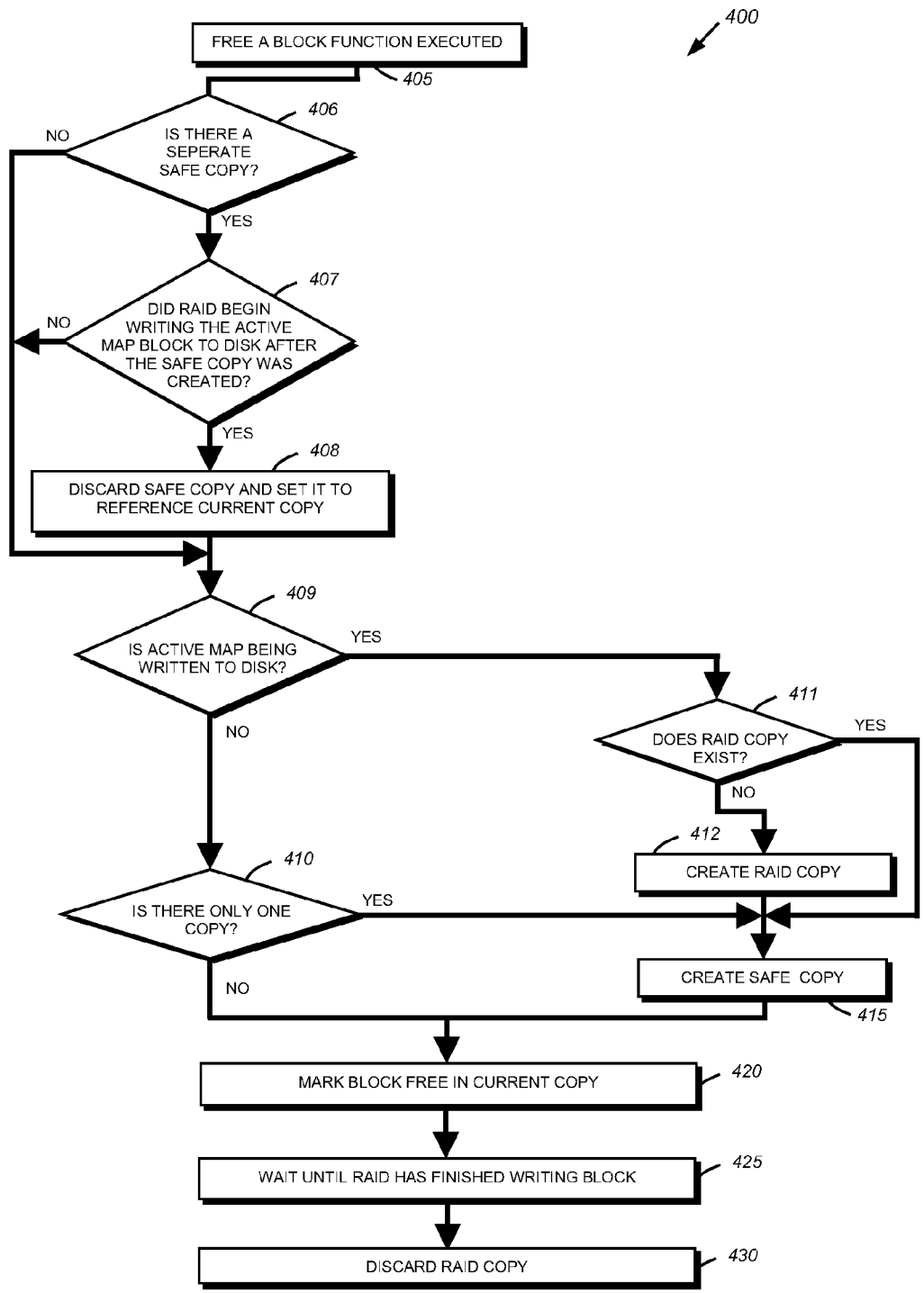
FIG. 4 is a flow chart detailing the steps of a procedure for freeing a block in accordance with an embodiment of the present invention.

The procedure 400 performed by the bitmap processes 340 when a block is freed is shown in FIG. 4. Initially, in step 405, a function is executed to free a block in the file system. This could be, for example, the deletion of a file, or a movement of a file from one file system to another. Then, in step 406, a determination is made whether a separate safe copy of the bitmap exists. If a safe copy of the bitmap exits, the procedure continues to step 407 where it is determined if the RAID layer began writing the active map block to disk after the safe copy of the bitmap was generated. If so, the procedure will discard the safe copy and set it to reference the current copy (step 408). This may be accomplished by, for example, setting appropriate memory pointers so that the current and safe copies occupy the same physical memory space.

If there is not a separate safe copy (step 406) or if the RAID layer did not begin writing the active map block to disk after the safe copy was created (step 407), the procedure will branch to step 409. In step 409, the procedure determines if the active map block is currently being written to disk. If the active map is being written to disk, the procedure branches to step 411 where the procedure determines if a RAID copy of the bitmap exists. If so, then the procedure branches to step 415 and creates a safe copy of the bitmap using conventional copy on write techniques and then continues to step 420. However, if a RAID copy does not exist in step 411, the procedure branches to step 412, where a RAID copy of the bitmap is created.

If more than one copy exists in step 410, then the procedure branches directly to step 415, where a safe copy of the bitmap is created using conventional copy on write techniques. The block is then marked as being free in the current copy (step 420). Next, the procedure waits until the RAID layer has finished writing the block to disk (step 425). After the checkpoint is performed, the RAID copy of the bitmap is discarded in step 430.

If the active map block is not being written to disk in step 409, the procedure branches to step 410, where the procedure determines if there is only one copy of the bitmap. There could be a single copy of the bitmap, for example, immediately after step 408 has executed if no RAID copy has been created for the block in question. At this point, there is only one distinct copy of the block (as the current, safe and RAID copies are all identical) and operations that need to alter either the safe or current copy alone, need to create the appropriate copy before allowing the modification to proceed. If there is only one copy of the bitmap, the procedure then branches to step 415, where a second copy of the bitmap is created (i.e., a safe copy) using conventional copy on write techniques, that is by storing both copies in the same physical memory space until one is modified at which time a new copy is physically created. If there are multiple copies of the bitmap, or after a second copy has been created, the block is marked as being free in the current copy (step 420). The procedure then continues to steps 425 and 430 as described above.

Allocating A Block

Figure 5:
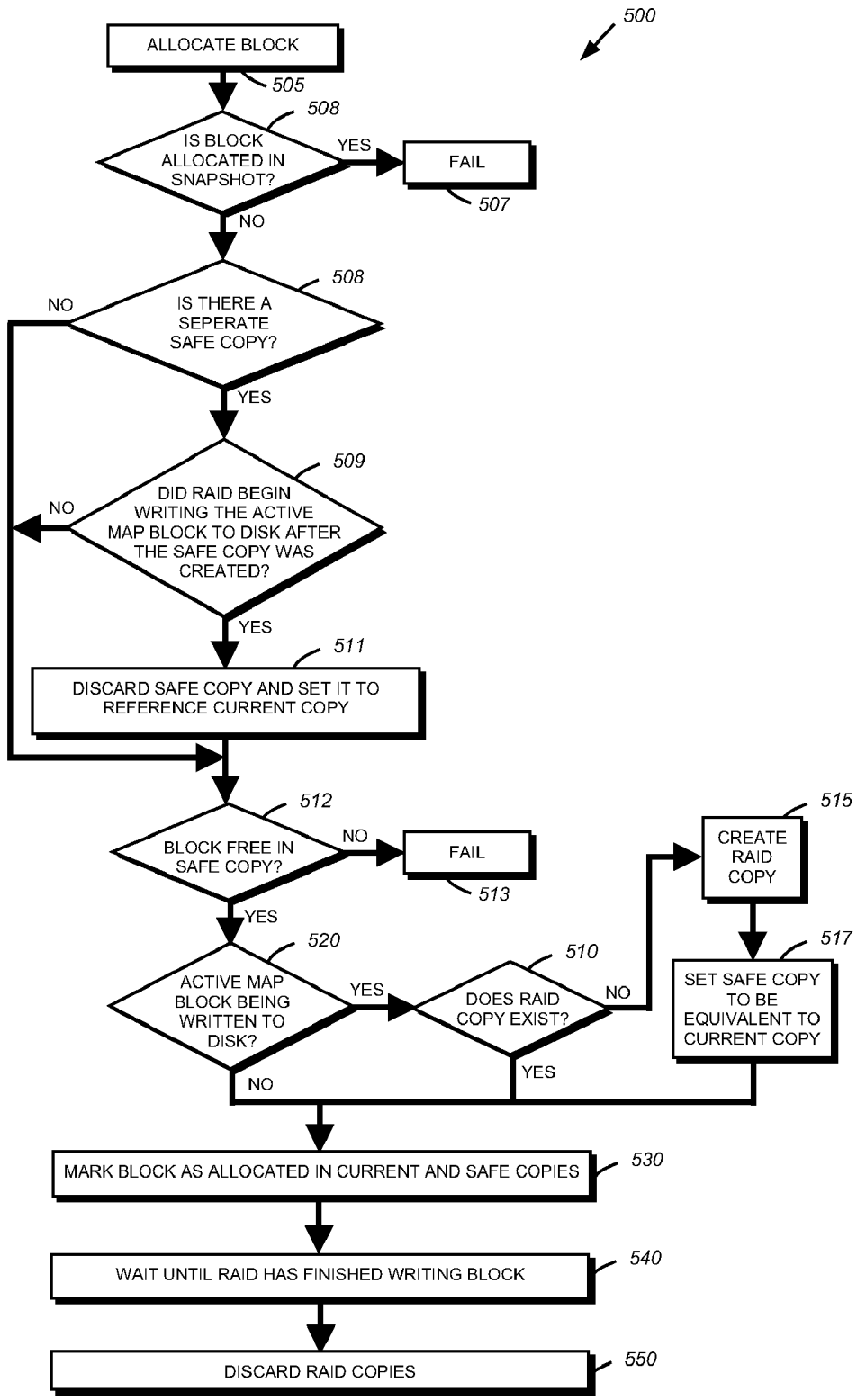
FIG. 5 is a flow chart of the steps of the procedure for allocating a block in accordance with an embodiment of the present invention.

When a block is allocated, the safe and current copies are modified to show that a block has been allocated. The procedure 500 performed by the bitmap processes 340 when a block is allocated is shown on FIG. 5. Initially, in step 505, a function is executed within the file system to allocate a block. Then, in step 506, the procedure determines if the block is allocated in any snapshot. This may be determined by examining the snapmaps associated with the various snapshots. If the block is already allocated in a snapshot, the block may not be allocated again and the procedure fails (step 507). If the block is not allocated in any snapshot, the procedure then determines, in step 508, whether there is a separate safe copy of the bitmap. If there is a separate safe copy, the procedure then, in step 509, determines if the RAID layer began writing the active map block to disk after the safe copy was created. If so, the procedure continues to step 511, where the procedure discards the safe copy and sets the safe copy to reference to the current copy. This may be accomplished by, for example, setting memory pointers so that the safe and current copies reference the same physical memory locations.

If there is not a separate safe copy (step 508) or if RAID did not begin writing the active map block to disk after the safe copy was created (step 509), the procedure will branch directly to step 512, where the procedure determines if the block is free in the safe copy of the bitmap. If the block is not free in the safe copy, then the block may not be allocated and the procedure fails (step 513). Otherwise, the bitmap processes then determine if the RAID layer is currently writing the active map block to disks in step 520. If the RAID layer is writing the active map to disk, the procedure branches to step 510 where a determination is made as to whether a RAID copy of the bitmap exists.

If a RAID copy does not exist, the procedure branches to step 515 where a RAID copy of the bitmap is created. This RAID copy is utilized by the RAID layer while writing the active map block to disk. The procedure then, in step 517, sets the safe copy to be equivalent to the current copy. This may be accomplished by, for example, by setting the safe copy to reference the same memory as the current copy.

If the active map block is not being written to disk (step 520), or a RAID copy of the bitmap exists (step 510) or after the RAID copy is created (steps 515 and 517), the block is marked as allocated in both the current and safe copies of the bitmap in step 530. After the block has been marked as allocated, the procedure waits until RAID has finished writing the block to disk in step 540. Once the RAID layer has completed its write operation, the procedure then discards the RAID copy in step 550.

Thus, procedure 500 can result in one, two or three copies of the bitmap depending upon whether any block have been freed and whether the RAID layer is writing a bitmap to disk. The procedure 500 may result in one copy of the bitmap if no blocks have been freed since the last checkpoint operation. In such a case, the safe, current, and RAID copies of the bitmap are identical, which obviates the need to make copies of the bitmap. If a block had been freed since the last checkpoint operation, then at least two copies of the bitmap will exist. If a block had been freed and no further allocations or reallocations are required while the RAID layer is writing the bitmap to disk, then only two copies of the bitmap will exist. However, if the RAID layer is writing the bitmap to disk while an operation needs to occur, then a third, or RAID copy, is created. By only generating a RAID copy when needed, memory is conserved by reducing the number of copies of the bitmap in existence at the same time.

Reallocating A Block

Figure 6:
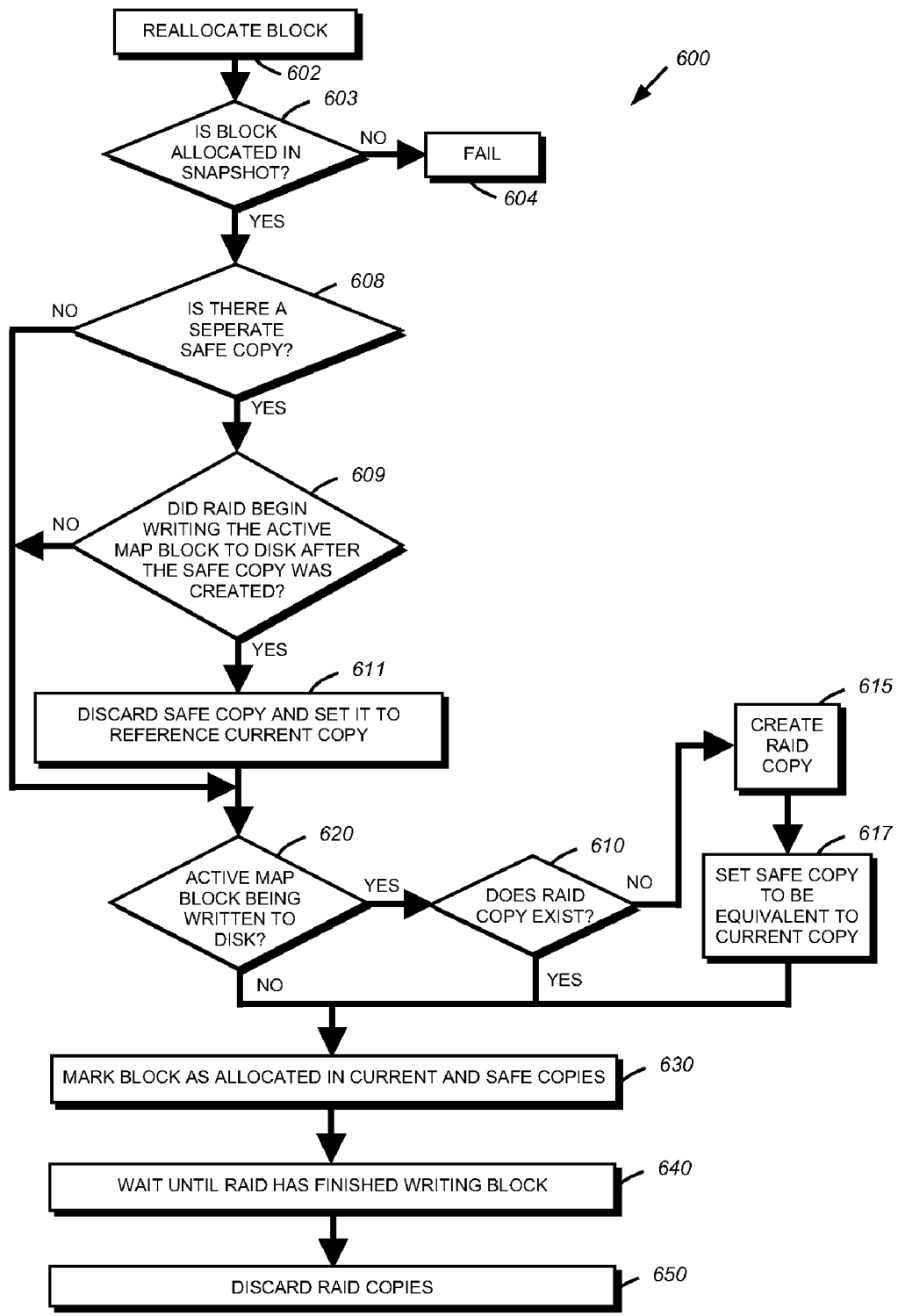
FIG. 6 is a flow chart of the steps of the procedure for reallocating a block in accordance with an embodiment of the present invention.

A block that is freed can be reallocated before a checkpoint has occurred which has committed the bitmap showing the freed block to disk as no new data is being written to disk. The procedure 600 performed by the bitmap management processes for the reallocation of a block is shown in FIG. 6. Initially, in step 602, a function is executed to reallocate a block. Then, in step 603, a determination is made as to whether the block is allocated in a snapshot. This may be accomplished by, for example, examining the snapmaps to see if the block is allocated. If the block is not allocated in a snapshot, the procedure fails (step 604). Otherwise, the procedure continues to step 608, where a deco termination is made whether there is a separate safe copy of the bitmap. If there is a separate safe copy, the procedure then, in step 609, determines if the RAID layer began writing the active map block to disk after the safe copy was created. If so, the procedure continues to step 611, where the procedure discards the safe copy and sets the safe copy to reference to the current copy. This may be accomplished by, for example, setting is memory pointers so that the safe and current copies reference the same physical memory locations.

If there is not a separate safe copy (step 608) or if RAID did not begin writing the active map block to disk after the safe copy was created (step 609), the procedure will branch directly to step 620, where the bitmap processes then determine if the RAID layer is currently writing the active map block to disk. If the RAID layer is writing the active map to disk, the procedure branches to step 610 where a determination is made as to whether a RAID copy of the bitmap exists.

If a RAID copy does not exist, the procedure branches to step 615 where a RAID copy of the bitmap is created. This RAID copy is utilized by the RAID layer while writing the active map block to disk. The procedure then, in step 617, sets the safe copy to be equivalent to the current copy. This may be accomplished by, for example, by setting the safe copy to reference the same memory as the current copy.

If the active map block is not being written to disk (step 620), or a RAID copy of the bitmap exists (step 610) or after the RAID copy is created (steps 615 and 617), the block is marked as allocated in both the current and safe copies of the bitmap in step 630. After the block has been marked as allocated, the procedure waits until RAID has finfished writing the block to disk in step 640. Once the RAID layer has completed its write operation, the procedure then discards the RAID copy in step 650.

Thus, when a block is reallocated during a checkpoint operation, a determination is made whether or not the block is currently referenced by an existing snapshot. If so, then the block may be marked as allocated again in the active file system and the data is known to not have changed since data that is part of a snapshot cannot be changed. Managing up to three copies of the bitmap allows both block allocation and block freeing to occur while RAID is writing the active map blocks to disk. The novel system and method enables single blocks to be reallocated into the active file system. In contrast, conventional snapshot systems typically required that the entire version of the active file system be replaced with a point-in-time image of the file system stored in a snapshot.

To again summarize, a set of novel bitmap management processes provides a set of procedures that enable a file system to track which blocks are free or allocated in a given file system and to reincorporate data that has been deleted from the active file system but is still referenced by one or more snapshots. The bitmap management processes maintain one, two or three copies of the bitmaps. The bitmap management processes, contain within the file system layer of a storage operating system, or to provide procedures for maintaining a bitmap or bitmaps that attract the allocation status of blocks in the file system, and enable certain file system procedures to continue to continue operating while the active bitmaps are being written to disk.

It should be noted that this application is written in terms of reallocating a block for exemplary purposes only. As used with the teachings of the present invention, the term "block" may be any single unit of allocation, including, for example, an arbitrary sized range of blocks, a pair of blocks or any other unit of allocation associated with a file system.

The foregoing has been a detailed description of the illustrative embodiment of the invention. Various modifications and additions can be made without departing from the spirit and scope of the invention. While this description has been written with reference to the WAFL file system, space maps and active maps, it should be noted that the principles of the invention apply to any file system and/or architecture for tracking block allocations in a file system. Additionally, this description has been written in terms of a software-based bitmap management processes, however it is expressly contemplated that the teachings of this invention can be implemented as software, including a computerreadable medium having program instructions and executing on a computer, hardware, firmware, or a combination thereof. Accordingly, this description should be taken only by way of example and not to otherwise limit the scope of the invention.

What is claimed is:

1. A method for operating a storage system, comprising:
maintaining a first portion of a storage operating system of the storage system for writing data to persistent storage operatively connected to the storage system;
maintaining a second portion of the storage operating system for managing a plurality of bitmaps that track an allocation status of blocks of the persistent storage;
maintaining a first bitmap of the plurality of bitmaps;
maintaining a second bitmap comprising a first copy of the first bitmap;
determining that the first portion is to write the first bitmap to the persistent storage while the second portion is to modify at least one of the first bitmap and the second bitmap;
in response to determining that the first bitmap is to be written to the persistent storage while the second portion is to modify the at least one of the first bitmap and the second bitmap, creating a third bitmap comprising a second copy of the first bitmap;
in response to creating the third bitmap, using the third bitmap by the first portion to be written to the persistent storage, and using the at least one of the first bitmap and the second bitmap by the second portion for modifications;
executing a block allocation procedure to allocate a data block to the persistent storage;
marking the data block as allocated in the first bitmap and the second bitmap; and
waiting until the first portion finishes writing the data block to the persistent storage, and in response to finishing, discarding the third bitmap.

2. The method as in claim 1, further comprising:
finishing writing the third bitmap to the persistent storage, and in response, discarding the third bitmap.

3. The method as in claim 1, further comprising:
using a redundant array of independent disk (RAID) portion as the first portion.

4. The method as in claim 1, further comprising:
using an active map as the first bitmap.

5. The method as in claim 1, further comprising:
determining whether the second bitmap exists, and in response to determining the second bitmap does not exist, creating the second bitmap.

6. The method as in claim 1, further comprising:
using a file system portion as the second portion.

7. The method as in claim 1, further comprising:
waiting until the third bitmap is written to the persistent storage; and in response to the third bitmap being written to the persistent storage, discarding the second bitmap.

8. The method as in claim 1, further comprising:
determining whether a first data block associated with the first bitmap is allocated in a snapshot;
determining whether the first data block is free in the second bitmap; and
allocating the first data block in response to determining the first data block is not allocated in the snapshot and in response to determining the first data block is free in the second bitmap.

9. The method as in claim 1, further comprising:
modifying memory pointers to create the second bitmap by having the memory pointers point to the first bitmap.

10. A computerized storage system, comprising:
a first portion of a storage operating system of the storage system configured to write data to persistent storage operatively connected to the computerized storage system;
a second portion of the storage operating system configured to manage a plurality of bitmaps that track an allocation status of blocks of the persistent storage;
the second portion further configured to maintain a first bitmap of the plurality of bitmaps to show data allocation of the persistent storage;
the second portion further configured to maintain a second bitmap comprising a first copy of the first bitmap;
the second portion further configured to maintain a third bitmap comprising a second copy of the first bitmap;
the first portion further configured to write the third bitmap to the persistent storage while a modification to at least one of the first bitmap and the second bit map is to occur;
the second portion further configured to use the at least one of the first bitmap and the second bitmap for modifications, wherein the first portion is further configured to write the third bitmap to the persistent storage;
a processor configured to:
execute block allocation procedure to allocate a data block to the persistent storage;
mark the data block as allocated in the first bitmap and the second bitmap; and
wait until the first portion finishes writing the data block to the persistent storage, and in response to finishing, discard the third bitmap.

11. The computerized storage system of claim 10, further comprising:
the first portion further configured to discard the third bitmap in response to finishing writing the third bitmap to the persistent storage.

12. The computerized storage system of claim 10, further comprising:
wherein the first portion comprises a redundant array of independent disks (RAID) portion.

13. The computerized storage system of claim 12, further comprising:
wherein the first bitmap comprises an active map.

14. The computerized storage system of claim 10, further comprising:
wherein the second bitmap is created in response to the second portion determining the second bitmap does not exist.

15. The computerized storage system of claim 10, further comprising:
wherein the second portion comprises a file system portion.

16. The computerized storage system of claim 10, further comprising:
a process configured to determine whether a first data block associated with the first bitmap is allocated in a snapshot;
the process further configured to determine whether the first data block is free in the second bitmap; and
the process further configured to allocate the block in response to determining the first data block is not allocated in the snapshot and in response to determining the first data block is free in the second bitmap.

17. The computerized storage system of claim 10, further comprising:
a memory configured to store the second bitmap, wherein the second portion is further configured to modify pointers in the memory to point to the first bitmap to create the second bitmap.

18. A non-transitory computer readable media containing executable program instructions executed by a processor, comprising:
program instructions that maintain a first portion of a storage operating system of a storage system for writing data to persistent storage operatively connected to the storage system;
program instructions that maintain a second portion of the storage operating system for managing a plurality of bitmaps that track an allocation status of blocks of the persistent storage;
program instructions that maintain a first bitmap of the plurality of bitmaps;
program instructions that maintain a second bitmap comprising a first copy of the first bitmap;
program instructions that determine that the first portion is to write the first bitmap to the persistent storage while the second portion is to modify at least one of the first bitmap and the second bitmap;
program instructions that, in response to determining that the first bitmap is to be written to the persistent storage while the second portion is to modify the at least one of the first bitmap and the second bitmap, create a third bitmap comprising a second copy of the first bitmap;
program instructions that, in response to creating the third bitmap, use the third bitmap by the first portion to be written to the persistent storage, and program instructions that use the at least one of the first bitmap and the second bitmap by the second portion for modifications;
program instructions that execute a block allocation procedure to allocate a data block to the persistent storage;
program instructions that mark the data block as allocated in the first bitmap and the second bitmap; and
program instructions that wait until the first portion finishes writing the data block to the persistent storage, and in response to finishing, discarding the third bitmap.

* * * * *

UNITED STATES PATENT AND TRADEMARK OFFICE
CERTIFICATE OF CORRECTION

PATENT NO. : 8,370,301 B1
APPLICATION NO. : 11/761829
DATED : February 5, 2013
INVENTOR(S) : Raymond C. Chen Page 1 of 2

It is certified that error appears in the above-identified patent and that said Letters Patent is hereby corrected as shown below:

In the Specifications:

In col. 1, line 45 should read:
data structures, such as ~~modes~~ inodes and data blocks, on disk are In col. 1, line 46 should read:
typically fixed. An ~~mode~~ inode is a data structure used to store In col. 1, line 49 should read:
The information contained in an ~~mode~~ inode may include, e.g., In col. 1, line 56 should read:
~~modes~~ inodes and data blocks are is made "in-place" in accordance In col. 1, line 56 should read:
modes and data blocks are ~~is~~ made "in-place" in accordance In col. 1, line 59 should read:
block is allocated and the appropriate ~~mode~~ inode is updated to In col. 2, line 60 should read:
until the block's allocation status ~~has~~ (as free) has been reflected In col. 4, line 51 should read:
attached to the network cloud is a ~~is~~ file server 200. This file In col. 5, line 5 should read:
type of a file server, wherever implemented as a special_purpose Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,370,301 B1

In col. 6, line 29 should read:
the disks. Each "on_disk" may be implemented as a set of In col. 6, line 62 should read:
tation that is block_based using, e.g., 4-kilobyte (KB) data In col. 6, line 63 should read:
blocks and using ~~modes~~ inodes to describe the files. Note that while In col. 7, line 43 should read:
326 indexes into the ~~mode~~ inode file using the mode number to In col. 7, line 43 should read:
326 indexes into the mode file using the ~~mode~~ inode number to In col. 11, line 8 should read:
cedure continues to step 608, where a ~~deco termination~~ determination is In col. 11, line 15 should read:
copy. This may be accomplished by, for example, setting ~~is~~

In col. 11, line 38 should read:
cated, the procedure waits until RAID has ~~finfished~~ finished writing In col. 12, line 18 should read:
mented as software, including a computer_readable medium In the Claims:

In col. 12, line 60 should read:
using a redundant array of independent disks (RAID) por- In col. 14, line 14 should read:
the process further configured to allocate the first data block in